(12) United States Patent
Yadav

(10) Patent No.: US 10,554,972 B2
(45) Date of Patent: *Feb. 4, 2020

(54) ADAPTIVE PRE-FILTERING BASED ON VIDEO COMPLEXITY, OUTPUT BIT RATE, AND VIDEO QUALITY PREFERENCES

(71) Applicant: Harmonic, Inc., San Jose, CA (US)

(72) Inventor: Ganesh Yadav, Milpitas, CA (US)

(73) Assignee: Harmonic, Inc., San Jose, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 15/686,541

(22) Filed: Aug. 25, 2017

(65) Prior Publication Data

US 2018/0014013 A1 Jan. 11, 2018

Related U.S. Application Data

(63) Continuation of application No. 14/697,151, filed on Apr. 27, 2015, now Pat. No. 9,787,987.

(51) Int. Cl.
*H04N 19/117* (2014.01)
*H04N 19/146* (2014.01)
*H04N 19/86* (2014.01)
*H04N 19/14* (2014.01)
*H04N 19/137* (2014.01)

(52) U.S. Cl.
CPC ......... *H04N 19/117* (2014.11); *H04N 19/137* (2014.11); *H04N 19/14* (2014.11); *H04N 19/146* (2014.11); *H04N 19/86* (2014.11)

(58) Field of Classification Search
None
See application file for complete search history.

(56) References Cited

U.S. PATENT DOCUMENTS

| 6,037,986 A | 3/2000 | Zhang et al. | |
| 7,430,329 B1* | 9/2008 | Sarna | H04N 19/61 348/404.1 |
| 9,001,889 B2 | 4/2015 | Lu et al. | |
| 9,326,006 B2 | 4/2016 | Chiang et al. | |
| 2004/0057517 A1* | 3/2004 | Wells | H04N 5/21 375/240.16 |
| 2007/0172211 A1 | 7/2007 | Panda et al. | |
| 2008/0101469 A1* | 5/2008 | Ishtiaq | G06T 5/002 375/240.13 |
| 2008/0192822 A1* | 8/2008 | Chang | H04N 19/172 375/240.03 |
| 2009/0080517 A1 | 3/2009 | Ko et al. | |

(Continued)

*Primary Examiner* — Mohammed S Rahaman
(74) *Attorney, Agent, or Firm* — Brokaw Patent Law PC; Christopher J. Brokaw

(57) ABSTRACT

Approaches for dynamic pre-filtering of digital video based on video complexity and output bit rate. An adaptive video preprocessor determines a current video complexity of the digital video and an output bit rate. Thereafter, the adaptive video preprocessor dynamically updates the strength of one or more preprocessing filters based on the current video complexity and the output bit rate for the digital video. The adaptive video preprocessor may update the strength of a preprocessing filter based, at least in part, upon selected values of a video quality preference category. A video quality preference category may be assigned natural language values which may each be translated into a particular strength value for at least one of the one or more preprocessing filters.

23 Claims, 5 Drawing Sheets

(56) References Cited

U.S. PATENT DOCUMENTS

2009/0324121 A1* 12/2009 Bhagavathy .............. G06T 5/50
                                                                    382/260
2010/0158126 A1    6/2010 Bai et al.
2013/0287112 A1   10/2013 Gisquet et al.

* cited by examiner

ADAPTIVE PRE-FILTERING BASED ON VIDEO COMPLEXITY, OUTPUT BIT RATE, AND VIDEO QUALITY PREFERENCES

CLAIM OF PRIORITY

This application is a continuation of, and claims priority to, U.S. patent application Ser. No. 14/697,151, entitled "Adaptive Pre-Filtering Based on Video Complexity and Output Bit Rate, invented by Ganesh Yadav, filed on Apr. 27, 2015, the disclosure of which is hereby incorporated by reference in its entirety for all purposes as if fully set forth herein.

FIELD OF THE INVENTION

Embodiments of the invention generally relate to adaptive pre-filtering of digital video based on video complexity and the output bit rate.

BACKGROUND

Motion video signals typically contain a significant amount of spatial and temporal redundancy. Video compression techniques take advantage of such spatial and temporal redundancy to reduce the amount of data bandwidth required to process, transmit and store video signals. MPEG-2 is a well-known video compression standard developed by the International Standards Organization (ISO) Moving Picture Experts Group (MPEG) and documented in "Information Technology Generic Coding of Moving Pictures and Associated Audio Information: Video," ISO/IEC DIS 13818-2 (Video), which is incorporated herein by reference. MPEG-2 video compression involves both spatial and temporal compression of video frames or fields. Other video standards, such as AVC 14496-10 and HEVC, also call for video compression techniques that involve both spatial and temporal compression of video frames or fields.

A digital video encoder is a component which converts digital video from one format to another for the purposes of standardization, speed, secrecy, security, and/or compression. A digital video encoder may receive a sequence of video frames or fields from a video source. Spatial compression may be applied to the video frames by the digital video encoder using the techniques of transform encoding, quantization, scanning, run-amplitude encoding and variable length coding for example. Temporal compression may be applied to the video frames by the digital video encoder using the techniques of motion estimation and motion compensation as an example.

Video preprocessing (also known as pre-filtering) techniques are applied prior to performing spatial and temporal compression. A digital video preprocessor is a component that processes a digital video signal using one or more preprocessing filters so that the digital video may be more efficiently compressed by subsequent video compression components, such as a digital video encoder. For example, the digital video preprocessor may alter the format of each frame in terms of the number of horizontal or vertical pixels in order to meet parameters specified by a video compression component. In addition, a digital video preprocessor may detect and beneficially inform a video compression component of certain scene changes and/or other image variations (such as a fade) in the digital video which increase compression difficulty.

Conventional video preprocessing techniques have generally been concerned with detecting and correcting obvious problematic situations in the visible content of the digital video, such as format alterations, scene changes and fades.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
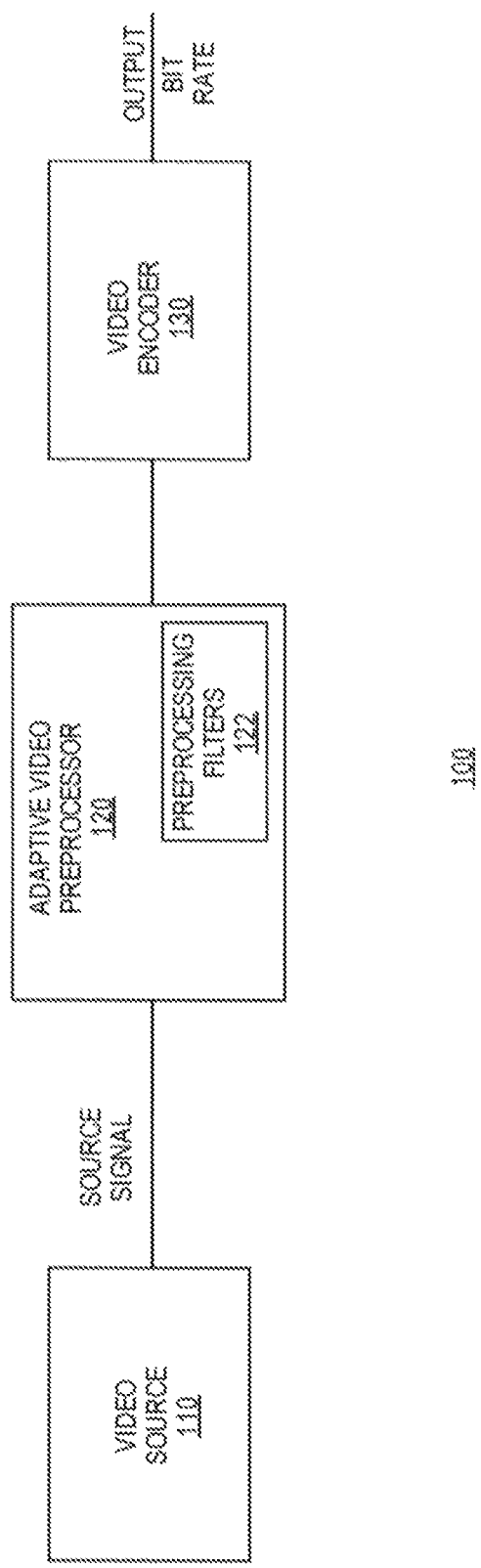
FIG. 1 is a block diagram depicts a system that includes an adaptive video preprocessor according to an embodiment of the invention.

Approaches for dynamic pre-filtering of digital video based on video complexity and output bit rate are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Embodiments of the invention provide approaches for an adaptive video preprocessor. An adaptive video preprocessor of an embodiment performs adaptive pre-filtering of digital video based upon video complexity and output bit rate (and potentially other factors as well). Embodiments of the invention may be used to perform video pre-filtering in a manner that improves the quality of encoding digital video at all output bit rates. As used herein, the terms "pre-filtering" and "preprocessing" both refer to the same concept, namely the processing of digital video using one or more preprocessing filters so that the digital video may be more efficiently compressed by subsequent video compression components (such as a digital video encoder).

According to an embodiment, an adaptive video preprocessor dynamically determines how to perform pre-filtering on digital video by considering the current complexity of the digital video content relative to the output bit rate. Note that while the output bit rate remains constant, the complexity of the digital video content can change over time. As such, a measure of the complexity of the digital video content relative to the output bit rate also fluctuates over time.

According to an embodiment, the particular configuration of pre-processing filters used by the adaptive video preprocessor will depend upon the current measure of the complexity of the digital video content relative to the output bit rate (referred to herein as the "complexity-output bit rate ratio". Certain embodiments use a measure named basequant as a complexity-output bit rate ratio.

For example, when digital video has a relatively high complexity-output bit rate ratio, an adaptive video preprocessor of an embodiment may tend to do less filtering and instead enhance the color and sharpen the picture. However, when digital video has a relatively low complexity-output bit rate ratio, an adaptive video preprocessor of an embodiment may tend to do soften the visual content of the digital video by preserving more color, removing more noise and artifacts, and attempting to make the digital video more pleasing to the eye.

As shall be explained in more detail below, embodiments may also consider a number of other factors besides a complexity-output bit rate ratio in determining how to perform pre-filtering. For example, an adaptive video preprocessor of an embodiment may also consider the amount of noise in the digital video, (b) the amount of activity in the digital video, and/or (c) the speed or motion depicted in the digital video when performing pre-processing.

Embodiments of the invention provide a simpler and more qualitative interface to the user for fine tuning his video preferences in an interface exposed by an encoder/transcoder. Using embodiments of the inventions, digital video distributors will be able to configure the digital video they distribute based on their preferences. For example, a digital video distributor may use an interface of an embodiment to express their preferences for clean, balanced, or sharper video output.

Additional embodiments and features shall be discussed below.

Illustrative System

FIG. 1 is a block diagram depicts a system 100 that includes adaptive video preprocessor 120 according to an embodiment of the invention. System 100 includes video source 110, adaptive video preprocessor 120, and video encoder 130. Video source 110 corresponds to any source of a digital video.

Adaptive video preprocessor 120 is a software component configured to perform adaptive pre-filtering or preprocessing of digital video as described herein. Adaptive video preprocessor 120 may perform pre-filtering using a set of one or more preprocessing filters 122. Embodiments may use different numbers and types of preprocessing filters 122. A non-limiting, illustrative list of the types of preprocessing filters which may be included in one or more preprocessing filters 122 include without limitation: a deblocking preprocessing filter, a mosquito noise reduction (MNR) preprocessing filter, a horizontal low-pass preprocessing filter (HLPF), the motion compensated temporal preprocessing filter (MCTF), a sharpening preprocessing filter, and a chroma boost preprocessing filter.

Video encoder 130 is a software component which converts digital video from one format to another for the purposes of standardization, speed, secrecy, security, and/or compression. For clarity, once video encoder 130 has processed a portion of digital video, the process portion of digital video will be referred to as encoded digital video. Video encoder 130 sends encoded digital video over a channel that has an output bit rate which fluctuates over time.

Pre-Processing Filter Strength and Video Quality Preference Categories

Adaptive video preprocessor 120 may perform pre-filtering using a set of one or more preprocessing filters 122. Each preprocessing filter 122 may be configured to operate according to a particular strength setting. A preprocessing filter having a greater strength value will process digital video to a greater extent than the same preprocessing filter having a lower strength value.

Embodiments of the invention may expose a user interface (a "filter user interface") which allows a user, such as someone associated with an entity responsible for transmitting digital video, to configure the strength setting of each of one or more preprocessing filters 122. In an embodiment, the filter user interface may depict a certain number of video quality preference categories. A user could select values using the filter user interface for each of the video quality preference categories. The values selected for each of the video quality preference categories can, in turn, be translated into particular default strength settings for certain preprocessing filters 122 associated with that video quality preference category. The advantage of such an approach is that it enables a user to express their video quality preferences using natural language rather than in the less intuitive native settings of a preprocessing filter 122.

Embodiments of the invention may use any number of video quality preference categories. Also, each video quality preference category could have any number of allowable values, depending upon how many options one wishes to provide the user. To illustrate a concrete example, an embodiment may provide three video quality preference categories: stress bias, noise reduction, and picture enhancement. The stress bias video quality preference category may be assigned one of three possible values, namely: sharp, balanced, and clear, which correspond to weak, medium, and strong filtering strengths respectively. The noise reduction video quality preference category may be assigned one of five possible values, namely: disabled, automatic, weak, medium, and strong. The picture enhancement video quality preference category may also be assigned one of five possible values, namely: disabled, automatic, weak, medium, and strong.

In this extended example, if disabled is selected for either the noise reduction video quality preference category or the picture enhancement video quality preference category, then certain preprocessing filters 122 which are associated with the disabled category will themselves become disabled (i.e., disabled preprocessing filters will not be used by adaptive video preprocessor 120). If automatic is selected for either the noise reduction video quality preference category or the picture enhancement video quality preference category, then the strength of those filters in preprocessing filters 122 associated with the automatic category will be automatically determined by adaptive video preprocessor 120 based on the complexity-output bit rate-ratio.

Figure 2:
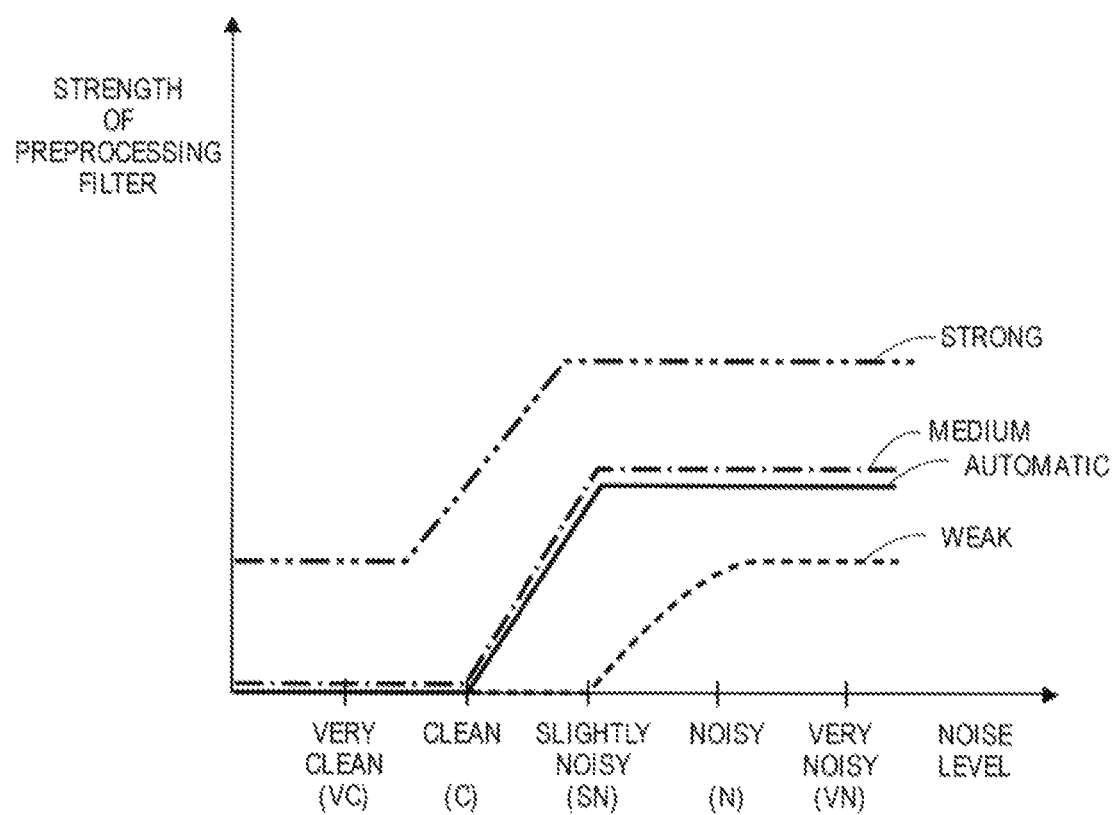
FIG. 2 is an illustration of the relative strengths assigned to an exemplary preprocessing filter based on different selected values of a video quality preference category for a particular output bitrate according to an embodiment of the invention.

If a video quality preference category is assigned a value of weak, medium, or strong, then the strength of any preprocessing filters 122 associated with that video quality preference category will be based on an adjustment or offset from the automatic filter strength dependent upon the particular value selected. To illustrate, consider FIG. 2, which is an illustration of a strength profile for a particular output bit rate or range of output bit rates. The strength profile of FIG. 2 shows the relative strengths assigned to an exemplary preprocessing filter based on different selected values of a video quality preference category for that preprocessing filter. For example, FIG. 2 depicts the strength profile the selected values of strong, medium, automatic, and weak.

In FIG. 2, note that the strength of the preprocessing filter will change according to the noise level of the digital video. FIG. 2 depicts five different noise levels, namely very clean (VC), clean (C), slightly noisy (SN), noisy (N), and very noisy (VN). The five noise levels depicted in FIG. 2 are merely examples; embodiments may use any number of noise level and any criteria or methodology for determining what amount of noise corresponds to a particular noise level.

Also, note that the strength profile of FIG. 2 depicts the relative strengths assigned to an exemplary preprocessing filter for a particular output bit rate or range of output bit rates. Embodiments may employ any number of different strength profiles that are each associated with a different output bit rate or range of output bit rates.

As show in FIG. 2, the strength of any preprocessing filter 122 having a video quality preference category assigned a value of medium will closely track the strength assigned to the value of automatic. An embodiment may employ a strength profile that assigns the same strength of any preprocessing filter 122 having a video quality preference category assigned a value of medium as the strength assigned to a preprocessing filter 122 having a video quality preference category assigned a value of the value of automatic. In other embodiments, the strength profile may be used that assigns a similar, but not identical, strength of any preprocessing filter 122 having a video quality preference category assigned a value of medium as the strength assigned to a preprocessing filter 122 having a video quality preference category assigned a value of the value of automatic.

An aim of adaptive video preprocessor 120 is to enhance the subjective video quality of digital video encoded by video encoder 130 at all output bitrates. To do so, adaptive video preprocessor 120 may reduce the complexity of the digital video content at lower output bitrates and enhance details of the content in the digital video at higher output bitrates. Correspondingly, adaptive video preprocessor 120 may slightly increase the complexity of the content in the digital video at higher output bitrates. A balanced approach may be taken by adaptive video preprocessor 120 when the output bitrate is in the middle range.

To enhance the subject video quality of digital video, adaptive video preprocessor 120 may dynamically adjust the strength of the preprocessing filters 122 used the strength profiles discussed above with respect to FIG. 2.

Using Qscale to Improve Subjective Video Quality

Figure 3:
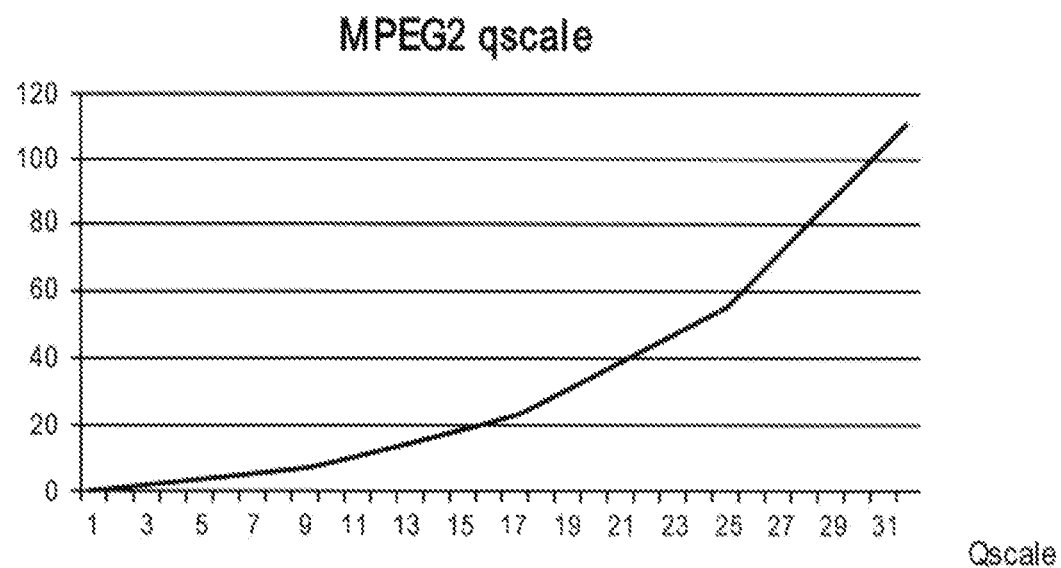
FIG. 3 depicts a qscale range extending from low quantization error at lower qscales to higher quantization error at higher qscales for the MPEG2 digital video protocols using an adaptive video preprocessor according to an embodiment of the invention.
Figure 4:
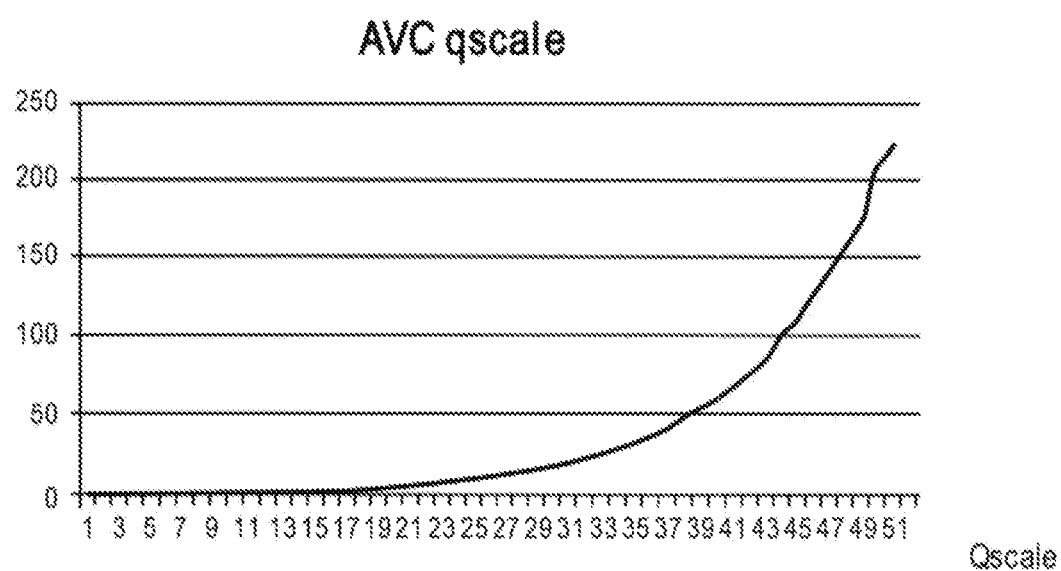
FIG. 4 depicts a qscale range extending from low quantization error at lower qscales to higher quantization error at higher qscales for the AVC digital video protocols using an adaptive video preprocessor according to an embodiment of the invention.

Qscale refers to a measure that represents variable bitrate qualities such that the lower the qscale value, the higher the quality of the digital video. FIGS. 3 and 4 depict a qscale range extending from low quantization error (y-axis) at lower qscales (x-axis) to higher quantization error at higher qscales for the MPEG2 and AVC digital video protocols respectively. The MPEG2 qscale range shown in FIG. 3 and the AVC qscale range shown in FIG. 4 both cover a range extending from low quantization error (y-axis) at lower qscales (x-axis) to high quantization error (y-axis) at high qscales (x-axis). When digital video has a high qscale value, the high quantization error of the digital video could introduce ringing artifacts at high spatial frequencies and blockiness on block transform boundaries.

To improve the subjective video quality, adaptive video preprocessor 120 may dynamically adjust the strength of preprocessing filters 122 such that the edges need to be smoothened at low output bitrates or high qscale values. Edges are points in a digital image at which the image brightness changes sharply or, more formally, has discontinuities. The points at which image brightness changes sharply are typically organized into a set of curved line segments termed edges. On the other hand, the source digital video could be edge enhanced (i.e., boosting the edges, leading to sharpening the edges of objects) by high pass filtering at low qscale values. Adaptive video preprocessor 120 may consult appropriate statistics to determine the present qscale value of the digital video; thereafter adaptive video preprocessor 120 will dynamically use low pass filtering for high qscales, high pass filtering for lower qscales, and bandpass filtering for the middle range of qscales. Thus, a combination of lowpass, highpass and bandpass filters can be used to support edge enhancement, texture smoothing, and passthrough (in this context passthrough means not performing any filtering on the input video signal).

The greater the amount of motion in a portion of digital video, the greater the difficulty in predicting the details of the digital video frames in that portion. As a result, adaptive video preprocessor 120 of an embodiment may favor picture smoothing filters over picture sharpening filters when there is considerably high motion between successive frames in the digital video being processed.

For high quality video using low qscales, it is desirable to obtain sharp video even though the enhanced high frequency components could slightly increase the overall qscale value for the picture. When video encoder 130 uses high qscale values, certain undesirable artifacts in the appearance of the digital video may be produced. Advantageously, adaptive video preprocessor 120 may employ a smoothened picture preprocessing filter 122 to reduce the qscale or alleviate the appearance of discontinuous artifacts when the qscale value exceeds a particular threshold.

Dynamically Configuring Preprocessing Filters

The complexity-output bit rate ratios and the amount of noise in a source signal are metrics which may be used in configuring the strength of certain preprocessing filters 122 used by adaptive video preprocessor 120. For example, the strength of motion compensated temporal preprocessing filter (MCTF) and the sharpening preprocessing filter may be configured by adaptive video preprocessor 120 based on the complexity-output bit rate ratios (or basequant) and the amount of noise in a source signal. Other metrics may also be used by adaptive video preprocessor 120 in configuring the strength of preprocessing filters 122 used by adaptive video preprocessor 120. For example, to dynamically configure the strength of the deblocking preprocessing filter, adaptive video preprocessor 120 may consult a metric which indicates the amount of blockiness in the source signal. As another example, to dynamically configure the strength of the mosquito noise reduction (MNR) preprocessing filter, adaptive video preprocessor 120 may consult a metric which indicates the amount of mosquito noise in the source signal.

Figure 5:
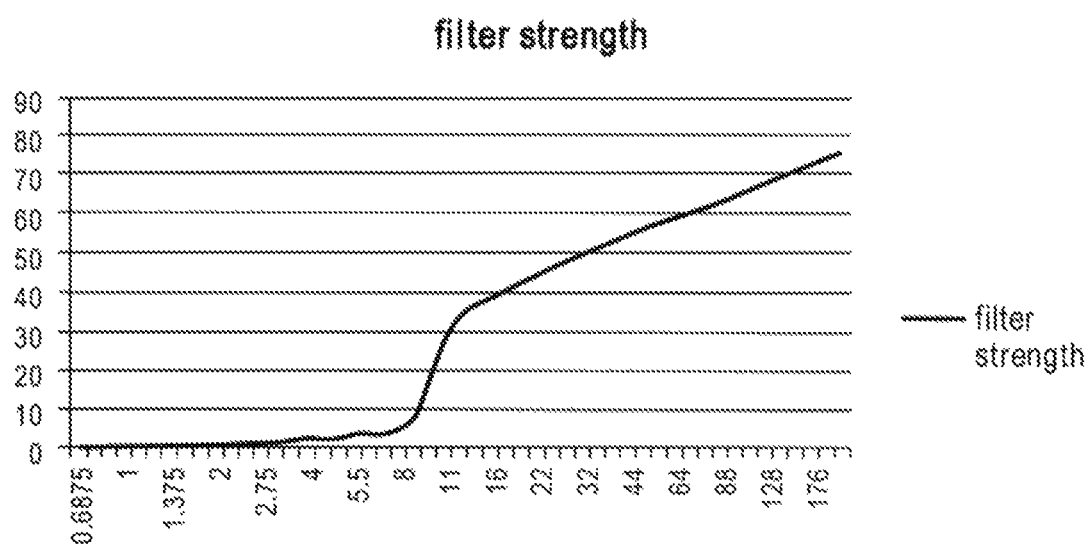
FIG. 5 depicts a filter strength curve according to an embodiment of the invention.

In an embodiment, the strengths of those preprocessing filters 122 may be determined by filter index mapping in lieu of actually traversing the curve on each filter. FIG. 5 depicts a first filter strength curve according to one embodiment of the invention. In the example illustrated by FIG. 5, the following equation may be used to derive the filter strength of the noise reduction or HLPF filter(s) based on the basequant:

basequant_strength=(($qp$+1)*($q$scale−$q$scale(17)/(1+ABS($q$scale−$q$scale(17)))+($qp$+1))*0.75

Figure 6:
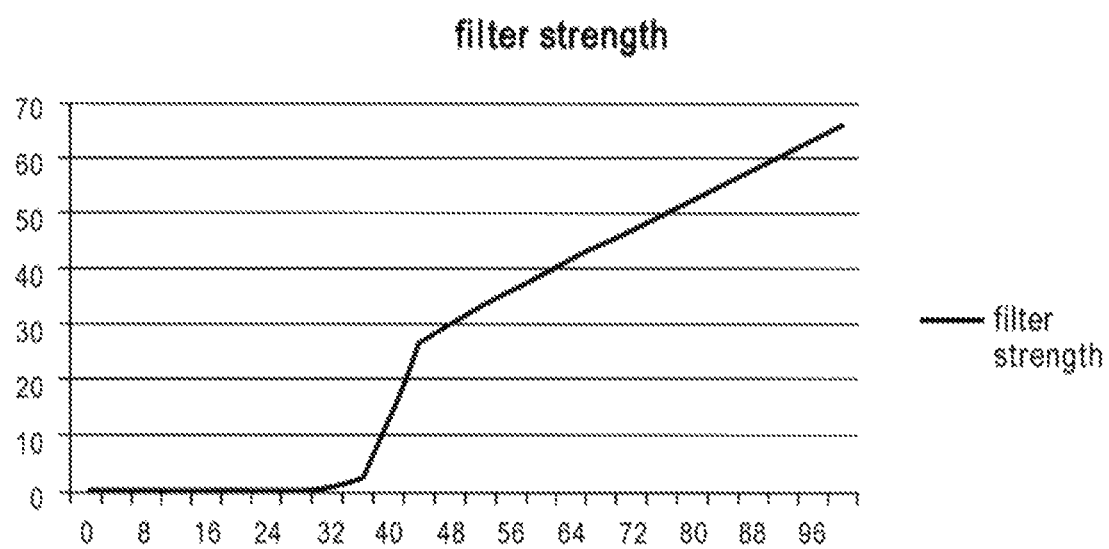
FIG. 6 depicts another filter strength curve according to an embodiment of the invention.

To illustrate another example of filter index mapping, consider FIG. 6, which depicts another filter strength curve according to an embodiment of the invention. The following equation may be used to derive the filter strength of the noise reduction or HLPF filter(s) based on the noise level.

noiselevel_strength=(noise_level*(noiselevel−40)/(1+ABS(noiselevel−60))+noise_level)/3 final_strength=(basequant_strength+noiselevel_strength)/2

In lieu of quantizing the basequant and/or noise level into different regions, a curve tracing strategy such as the above approach may be used to derive more fine-grained filter strength values than relying upon strength values assigned to different regions of the curve. Using this exemplary curve tracing strategy may also be employed to dynamically obtain the filter strength for other preprocessing filters, such as MCTF and HLPF.

In an embodiment, preprocessing filters such as sharpening and chroma boost may also have their strengths dynamically determined using a curve tracing strategy, e.g., by using the following equations:

basequant_strength=76−(($qp$+1)*($q$scale−$q$scale(17)/(1+ABS($q$scale−$q$scale(17)))+($qp$+1))*0.75 noiselevel_strength=67−(noise_level*(noiselevel−40)/(1+ABS(noiselevel−60))+noise_level)/3 final_strength=(basequant_strength+noiselevel_strength)/2

The purpose of filter index mapping is to enhance edges (boosting the edges, leading to the sharpening of object edges) by high pass filtering if encoding artifacts are imperceptible at low qscales and to reduce the high spatial frequency components by low pass filtering if encoding artifacts dominate the noise at high qscales.

More complicated filter selection and adaptation may be used by embodiments. For example, to configure the motion compensated temporal preprocessing filter (MCTF), adaptive video preprocessor 120 of an embodiment may consult the basequant, motion statistics and the amount of noise in a source signal. As another example, to configure the horizontal low-pass preprocessing filter (HLPF), adaptive video preprocessor 120 of an embodiment may consult the basequant and the horizontal activity of the digital video. Additionally, to configure the sharpening preprocessing filter, adaptive video preprocessor 120 of an embodiment may consult the basequant, the amount of noise in the source signal, and the average macroblock activity. To configure the mosquito noise reduction (MNR) preprocessing filter, adaptive video preprocessor 120 of an embodiment may consult the basequant, the amount of noise in the source signal, the average macroblock activity, and a mosquito noise measure. As one more example, to configure the control deblocking preprocessing filter, adaptive video preprocessor 120 of an embodiment may consult the basequant, the amount of noise in the source signal, the vertical and horizontal activity, and a blockiness measure.

Adaptive video preprocessor 120 of an embodiment operates under the principles that (a) the level of noise in a digital video stream should be able to catch noise, ringing or blockiness (b) if there is noise present in the digital video which is difficult to encode and causes strain on the encoding process (perhaps caused by an area of an image that requires to many bits to describe and thus starves other areas of bits, leading to distortion to the image as a whole), then the basequant value should already reflect this condition, and (c) there is no need to get rid of miniscule noise or film grain when the output bitrate allows such noise or film grain to be encoded by video encoder 130. Embodiments may employ more complicated schemes if their value offsets any additional burden resulting from their complexity.

One of the most challenging issues in designing a preprocessing filter 122 for digital video is the need to distinguish between noise and feature, as doing so is not possible without a reasonably accurate estimation of the noise in the digital video. Knowledge of how much noise is present in a digital video helps the preprocessing filter 122 to clean the noise from digital video signal, which in turn allows video encoder 130 to spend more bits of data describing features rather than noise. However, caution should be taken to avoid cleaning up intentional pleasing noise, such as film grain for example.

One of the problems presented by a sharpening filter is that it increases background noise while decreasing the usable signal. To alleviate this problem, it is important to control the noise level using the motion compensated temporal preprocessing filter (MCTF) in conjunction with the sharpening preprocessing filter. One of the goals of the sharpening preprocessing filter is to decrease contours caused by compression. This is achieved through contrast enhancement in the flat gradients leading to cleaner dither of flat gradients and cleanly coded flat areas. The motion compensated temporal preprocessing filter (MCTF) and the sharpening preprocessing filter also preserve or enhance resolution.

Classifying Complexity-Output Bit Rate Ratios

Embodiments may classify complexity-output bit rate ratios (e.g., basequant values) into various categories, for example non-stressful (NS), stressful (S) and very stressful (VS).

In an embodiment, when the complexity-output bit rate ratio is deemed non-stressful (NS), the sharpened preprocessing filter is enabled and used and the MCTF preprocessing filter is disabled and not used. When the complexity-output bit rate ratio is deemed stressful (S), the sharpening preprocessing filter and the MCTF preprocessing filter are both enabled and used. When the complexity-output bit rate ratio is deemed very stressful (VS), the sharpened preprocessing filter is disabled and not used and the MCTF preprocessing filter is enabled and used.

In an embodiment, basequant=$\Sigma_{k=0}^{n} X_k$/bitrate, where n is number of pictures in a second, $X_k$ is complexity of picture k. $X_k$=picsize$_{pictype}$*qscale$_{pictype}$/$K_{pictype}$, where pictype could be a different picture type I, P, B, b, or different B/b pictures in the hierarchy. $K_{pictype}$ is the qscale multiplier for a given picture type. Typical values of $K_{pictype}$ are 1.0 for I pictures, 1.41 for P picture, 1.26 for B picture and b=$K_B$*1.12 and so on for different B pictures in the hierarchy. Thus, basequant is the normalized spatial complexity parameter for a group of pictures.

The stress or source complexity for various bitrates may be classified based on the basequant values. If the source video is an MPEG2 digital video, then the basequant could take one of the values on the MPEG2 qscale curve shown in FIG. 2. To illustrate one example, for the MPEG2 protocol:

If basequant<22, content is NS for this bitrate,
Else if basequant<52, content is S for this bitrate,
Else if basequant<80, content is VS for this bitrate,
Else If basequant>=80, content is Extremely Stressful (ES) for this bitrate.

If the source video is an AVC digital video, then the basequant could take one of the values on the AVC qscale curve shown in FIG. 4. To illustrate an example, for the AVC protocol:

If basequant<18, content is NS for this bitrate,
Else if basequant<56, content is S for this bitrate,
Else if basequant<104, content is VS for this bitrate,
Else If basequant>=104, content is Extremely Stressful (ES) for this bitrate.

Note that the above values are merely examples, as other embodiments may use different basequant values to differentiate between categories of complexity-output bit rate ratios or basequants. By the same token, the number of categories of complexity-output bit rate ratios or basequants discussed above are merely exemplary of one embodiment, as other embodiments of the invention may use fewer or a greater number of categories.

Configuring the MCTF Preprocessing Filter

The relative strength of the motion compensated temporal preprocessing filter (MCTF) may be dynamically adjusted by adaptive video preprocessor 120 based on the complexity-output bit rate ratios (or basequant) and the amount of noise in a source signal. Speed is filtered less to reduce the reaction time of various filters to high motion activity depicted by the digital video. The motion compensated temporal preprocessing filter (MCTF) is the most reactive filter of the one or more preprocessing filters 122 in terms of delay.

Table 1 depicts the adaptive strength assigned to the motion compensated temporal preprocessing filter (MCTF) by adaptive video preprocessor 120 when the MCTF is operating in automatic mode:

TABLE 1

|    | VC | C | SN | N | VN |
|----|----|---|----|---|----|
| NS | 0  | 0 | 1  | 2 | 2  |
| S  | 0  | 1 | 2  | 2 | 3  |
| VS | 1  | 2 | 3  | 3 | 3  |

In Table 1, the strength values 1-5 correspond to Very Weak (VW), Weak (W), Medium (M), Strong (S), to Very Strong (VS) respectively. A strength value of 0 indicates that the filter is disabled. In an embodiment, when the video quality preference category of noise reduction has a value of automatic, the strength settings of the MCTF are those depicted in FIG. 1. Note that the particular strength setting of the MCTF will depend upon whether the complexity-output bit rate ratio (or basequant) is non-stressful (NS), stressful (S) and very stressful (VS). Further note that the particular strength setting of the MCTF will depend upon whether the level of noise in the digital video is deemed Very Clean (VC), Clean (C), Slightly Noisy (SN), Noisy (N), or Very Noisy (VN) as well as whether the signal is deemed to be very stressful (VS), stressful (S), or non-stressful (NS) by embodiments. Any approach for classifying the level of noise into the categories may be used to classify the level of noise as VC, C, SN, N, or VN by embodiments; similarly, any approach for classifying the stress of the video signal into the categories may be used to classify the stress of the video signal as VS, S, or NS by embodiments.

The strength of the motion compensated temporal preprocessing filter (MCTF) will be automatically adapted by adaptive video preprocessor 120 when the video quality preference category of noise reduction is in either Weak, Moderate, or Strong mode. When the video quality preference category of noise reduction is set to Weak, the strength of the MCTF is equal to Base Strength–delta, where Base Strength=the strength from Table 1 based on the classification of the noise and signal stress, and delta=MIN (2, (Base Strength+1)/2). When the video quality preference category of noise reduction is set to Moderate, the strength of the MCTF is equal to the strength from Table 1 based on the classification of the noise and signal stress. Thus, in an embodiment, the strength of the MCTF when noise reduction is set to Moderate is the same as when noise reduction is set to Automatic. When the video quality preference category of noise reduction is set to Strong, the strength of the MCTF is equal to Base Strength+delta, where Base Strength=the strength from Table 1 based on the classification of the noise and signal stress, and delta=MIN (2, (Base Strength+1)/2).

In certain embodiments, the current strength of the MCTF is filtered with its previous strength value for purposes of promoting smooth transitions when adjusting the strength of the filter. For example, the current strength of the MCTF= (strength$_{previous}$+the current strength of the MCTF)>>1.

Configuring the Sharpening Preprocessing Filter

Table 2 depicts the adaptive strength of the sharpening preprocessing filter operating in automatic mode:

TABLE 2

|    | VC | C | SN | N | VN |
|----|----|---|----|---|----|
| NS | 2  | 2 | 1  | 1 | 1  |
| S  | 2  | 2 | 1  | 1 | 0  |
| VS | 0  | 0 | 0  | 0 | 0  |

As with Table 1, in Table 2 the strength values 1-5 correspond to Very Weak (VW), Weak (W), Medium (M), Strong (S), to Very Strong (VS) respectively. A strength value of 0 indicates that the filter is disabled. In an embodiment, when the video quality preference category of picture enhancement has a value of automatic, the strength settings of the sharpening preprocessing filter are those depicted in FIG. 2. Note that the particular strength setting of the sharpening preprocessing filter will depend upon whether the complexity-output bit rate ratio (or basequant) is non-stressful (NS), stressful (S) and very stressful (VS). Further note that the particular strength setting of the sharpening preprocessing filter will depend upon whether the level of noise in the digital video is deemed Very Clean (VC), Clean (C), Slightly Noisy (SN), Noisy (N), or Very Noisy (VN). Any approach for classify the level of noise into the categories may be used to classify the level of noise as VC, C, SN, N, or VN as well as whether the signal is deemed to be very stressful (VS), stressful (S), or non-stressful (NS) by embodiments. Any approach for classifying the level of noise into the categories may be used to classify the level of noise as VC, C, SN, N, or VN by embodiments; similarly, any approach for classifying the stress of the video signal into the categories may be used to classify the stress of the video signal as VS, S, or NS by embodiments.

The strength of the sharpening preprocessing filter will be automatically adapted by adaptive video preprocessor 120 when the video quality preference category of picture enhancement is in either Weak, Moderate, or Strong mode. When the video quality preference category of picture enhancement is set to Weak, the strength of the sharpening preprocessing filter is equal to Base Strength−delta, where Base Strength=the strength from Table 2 based on the classification of the noise and signal stress, and delta=MIN (2, (Base Strength+1)/2). When the video quality preference category of picture enhancement is set to Moderate, the strength of the sharpening preprocessing filter is equal to the strength from Table 1 based on the classification of the noise and signal stress. Thus, in an embodiment, the strength of the sharpening preprocessing filter when noise reduction is set to Moderate is the same as when noise reduction is set to Automatic. When the video quality preference category of picture enhancement is set to Strong, the strength of the sharpening preprocessing filter is equal to Base Strength+ delta, where Base Strength=the strength from Table 1 based on the classification of the noise and signal stress, and delta=MIN(2, (Base Strength+1)/2).

In certain embodiments, the current strength of the sharpening preprocessing filter is filtered with its previous strength value for purposes of promoting smooth transitions when adjusting the strength of the filter. For example, the current strength of the sharpening preprocessing filter= (strength$_{previous}$+the current strength of the sharpening preprocessing filter)>>1.

Configuring the Chroma Boost Preprocessing Filter

Table 3 depicts the adaptive strength of the chroma boost preprocessing filter operating in automatic mode:

TABLE 3

|    | VC | C | SN | N | VN |
|----|----|---|----|---|----|
| NS | 1  | 1 | 1  | 2 | 2  |
| S  | 1  | 1 | 1  | 2 | 3  |
| VS | 3  | 3 | 3  | 3 | 3  |

As with Tables 1-2, in Table 3 the strength values 1-5 correspond to Very Weak (VW), Weak (W), Medium (M), Strong (S), to Very Strong (VS) respectively. A strength value of 0 indicates that the filter is disabled. In an embodiment, when the video quality preference category of picture enhancement has a value of automatic, the strength settings of the chroma boost preprocessing filter are those depicted in FIG. 3. Note that the particular strength setting of the chroma boost preprocessing filter will depend upon whether the complexity-output bit rate ratio (or basequant) is non-stressful (NS), stressful (S) and very stressful (VS). Further note that the particular strength setting of the chroma boost preprocessing filter will depend upon whether the level of noise in the digital video is deemed Very Clean (VC), Clean (C), Slightly Noisy (SN), Noisy (N), or Very Noisy (VN). Any approach for classify the level of noise into the categories may be used to classify the level of noise as VC, C, SN, N, or VN as well as whether the signal is deemed to be very stressful (VS), stressful (S), or non-stressful (NS) by embodiments. Any approach for classifying the level of noise into the categories may be used to classify the level of noise as VC, C, SN, N, or VN by embodiments; similarly, any approach for classifying the stress of the video signal into the categories may be used to classify the stress of the video signal as VS, S, or NS by embodiments.

The strength of the chroma boost preprocessing filter will be automatically adapted by adaptive video preprocessor 120 when the video quality preference category of picture enhancement is in either Weak, Moderate, or Strong mode. When the video quality preference category of picture enhancement is set to Weak, the strength of the sharpening preprocessing filter is equal to Base Strength−delta, where Base Strength=the strength from Table 3 based on the classification of the noise and signal stress, and delta=MIN (2, (Base Strength+1)/2). When the video quality preference category of picture enhancement is set to Moderate, the strength of the chroma boost preprocessing filter is equal to the strength from Table 3 based on the classification of the noise and signal stress. Thus, in an embodiment, the strength of the chroma boost preprocessing filter when noise reduction is set to Moderate is the same as when noise reduction is set to Automatic. When the video quality preference category of picture enhancement is set to Strong, the strength of the chroma boost preprocessing filter is equal to Base Strength+delta, where Base Strength=the strength from Table 3 based on the classification of the noise and signal stress, and delta=MIN(2, (Base Strength+1)/2).

In certain embodiments, the current strength of the chroma boost preprocessing filter is filtered with its previous strength value for purposes of promoting smooth transitions when adjusting the strength of the filter. For example, the current strength of the chroma boost preprocessing filter= (strength$_{previous}$+the current strength of the chroma boost preprocessing filter)>>1.

In an embodiment, when the sharpening preprocessing filter is disabled, too computationally expensive to perform, or otherwise unavailable, an additional constraint is applied to the strength of the chroma boost preprocessing filter. This is done to provide a more pleasing appearance to the digital video when sharpening preprocessing is not performed, e.g., due to sharpening processing being too computationally expensive. The chroma boost preprocessing filter saturates the colors, thus enhancing the picture and giving a perceptual appearance of more colors and sharpness. The processing that would have been performed by the unavailable sharpening preprocessing filter enhances the edges and gives a sharper appearance. Both the chroma boost and the sharpening preprocessing filter are used to complement each other so that the enhanced appearance is kept constant. In this way, when sharpening preprocessing becomes prohibitive, chroma boost preprocessing may be performed instead.

The additional constraint applied to the strength of the chroma boost preprocessing filter may be implemented by an embodiment as follow:

Chroma_boost_strength'=(3−sharpening_strength)

For a "Weak" setting: Chroma_boost_strength=MIN(2, MAX(Chroma_boost_strength, Chroma_boost_strength')
For a "Moderate" setting: Chroma_boost_strength=MIN(3, MAX(Chroma_boost_strength, Chroma_boost_strength')
For a "Strong" setting: Chroma_boost_strength=MIN(3, MAX(Chroma_boost_strength, Chroma_boost_strength')

Configuring the Horizontal Low-Pass Preprocessing Filter

Table 4 depicts the adaptive strength of the horizontal low-pass preprocessing filter (HLPF) operating in automatic mode:

TABLE 4

|    | VC | C | SN | N | VN |
|----|----|---|----|---|----|
| NS | 1  | 1 | 2  | 2 | 2  |
| S  | 1  | 1 | 2  | 2 | 3  |
| VS | 2  | 2 | 3  | 3 | 3  |

As with Tables 1-3, in Table 4 the strength values 1-5 correspond to Very Weak (VW), Weak (W), Medium (M), Strong (S), to Very Strong (VS) respectively. A strength value of 0 indicates that the filter is disabled. In an embodiment, when the video quality preference category of stress bias has a value of automatic, the strength settings of the chroma boost preprocessing filter are those depicted in FIG. 3. Note that the particular strength setting of the horizontal low-pass preprocessing filter (HLPF) will depend upon whether the complexity-output bit rate ratio (or basequant) is non-stressful (NS), stressful (S) and very stressful (VS). Further note that the particular strength setting of the horizontal low-pass preprocessing filter (HLPF) will depend upon whether the level of noise in the digital video is deemed Very Clean (VC), Clean (C), Slightly Noisy (SN), Noisy (N), or Very Noisy (VN). Any approach for classify the level of noise into the categories may be used to classify the level of noise as VC, C, SN, N, or VN as well as whether the signal is deemed to be very stressful (VS), stressful (S), or non-stressful (NS) by embodiments. Any approach for classifying the level of noise into the categories may be used to classify the level of noise as VC, C, SN, N, or VN by embodiments; similarly, any approach for classifying the stress of the video signal into the categories may be used to classify the stress of the video signal as VS, S, or NS by embodiments.

The strength of the horizontal low-pass preprocessing filter (HLPF) will be automatically adapted by adaptive video preprocessor 120 when the video quality preference category of stress bias is in either Cleaner, Balanced, or Sharper mode. When the video quality preference category of stress bias is set to Sharper, the strength of the horizontal low-pass preprocessing filter (HLPF) is equal to Base Strength−delta, where Base Strength=the strength from Table 4 based on the classification of the noise and signal stress, and delta=MIN(2, (Base Strength+1)/2). When the video quality preference category of stress bias is set to Balanced, the strength of the horizontal low-pass preprocessing filter (HLPF) is equal to the strength from Table 4 based on the classification of the noise and signal stress. When the video quality preference category of stress bias is set to Cleaner, the strength of the horizontal low-pass preprocessing filter (HLPF) is equal to Base Strength+delta, where Base Strength=the strength from Table 4 based on the classification of the noise and signal stress, and delta=MIN (2, (Base Strength+1)/2).

In certain embodiments, the current strength of the horizontal low-pass preprocessing filter (HLPF) is filtered with its previous strength value for purposes of promoting smooth transitions when adjusting the strength of the filter. For example, the current strength the horizontal low-pass preprocessing filter (HLPF)=(strength$_{previous}$+the current strength of the horizontal low-pass preprocessing filter (HLPF))>>1.

Configuring the Deblocking Preprocessing Filter

Table 5 depicts the adaptive strength of the deblocking preprocessing filter operating in automatic mode:

TABLE 5

|    | VC | C | SN | N | VN |
|----|----|---|----|---|----|
| NS | 1  | 1 | 1  | 1 | 1  |
| S  | 1  | 1 | 1  | 2 | 2  |
| VS | 2  | 2 | 2  | 2 | 2  |

As with Tables 1-4, in Table 5 the strength values 1-5 correspond to Very Weak (VW), Weak (W), Medium (M), Strong (S), to Very Strong (VS) respectively. A strength value of 0 indicates that the filter is disabled. In an embodiment, when the video quality preference category of noise reduction has a value of automatic, the strength settings of the chroma boost preprocessing filter are those depicted in FIG. 4. Note that the particular strength setting of the deblocking preprocessing filter will depend upon whether the complexity-output bit rate ratio (or basequant) is non-stressful (NS), stressful (S) and very stressful (VS). Further note that the particular strength setting of the deblocking preprocessing filter will depend upon whether the level of noise in the digital video is deemed Very Clean (VC), Clean (C), Slightly Noisy (SN), Noisy (N), or Very Noisy (VN). Any approach for classify the level of noise into the categories may be used to classify the level of noise as VC, C, SN, N, or VN as well as whether the signal is deemed to be very stressful (VS), stressful (S), or non-stressful (NS) by embodiments. Any approach for classifying the level of noise into the categories may be used to classify the level of noise as VC, C, SN, N, or VN by embodiments; similarly, any approach for classifying the stress of the video signal into the categories may be used to classify the stress of the video signal as VS, S, or NS by embodiments.

The strength of the deblocking preprocessing filter will be automatically adapted by adaptive video preprocessor 120 when the video quality preference category of noise reduction is in either Weak, Moderate, or Strong mode. When the video quality preference category of noise reduction is set to Weak, the strength of the deblocking preprocessing filter is equal to Base Strength−delta, where Base Strength=the strength from Table 3 based on the classification of the noise and signal stress, and delta=MIN(2, (Base Strength+1)/2). When the video quality preference category of noise reduction is set to Moderate, the strength of the deblocking preprocessing filter is equal to the strength from Table 3 based on the classification of the noise and signal stress. Thus, in an embodiment, the strength of the deblocking preprocessing filter when noise reduction is set to Moderate is the same as when noise reduction is set to Automatic. When the video quality preference category of noise reduction is set to Strong, the strength of the deblocking preprocessing filter is equal to Base Strength+delta, where Base Strength=the strength from Table 3 based on the classification of the noise and signal stress, and delta=MIN(2, (Base Strength+1)/2).

In certain embodiments, the current strength of the deblocking preprocessing filter is filtered with its previous strength value for purposes of promoting smooth transitions when adjusting the strength of the filter. For example, the current strength the deblocking preprocessing filter= (strength$_{previous}$+the current strength of the deblocking preprocessing filter)>>1.

Configuring the MNR Preprocessing Filter

Table 6 depicts the adaptive strength of the mosquito noise reduction (MNR) preprocessing filter operating in automatic mode:

TABLE 6

|    | VC | C | SN | N | VN |
|----|----|----|----|----|----|
| NS | 0  | 0  | 0  | 1  | 1  |
| S  | 0  | 0  | 1  | 1  | 1  |
| VS | 1  | 1  | 2  | 2  | 2  |

As with Tables 1-5, in Table 6 the strength values 1-5 correspond to Very Weak (VW), Weak (W), Medium (M), Strong (S), to Very Strong (VS) respectively. A strength value of 0 indicates that the filter is disabled. In an embodiment, when the video quality preference category of noise reduction has a value of automatic, the strength settings of mosquito noise reduction (MNR) preprocessing filter are those depicted in FIG. 6. Note that the particular strength setting of the mosquito noise reduction (MNR) preprocessing filter will depend upon whether the complexity-output bit rate ratio (or basequant) is non-stressful (NS), stressful (S) and very stressful (VS). Further note that the particular strength setting of the mosquito noise reduction (MNR) preprocessing filter will depend upon whether the level of noise in the digital video is deemed Very Clean (VC), Clean (C), Slightly Noisy (SN), Noisy (N), or Very Noisy (VN). Any approach for classify the level of noise into the categories may be used to classify the level of noise as VC, C, SN, N, or VN as well as whether the signal is deemed to be very stressful (VS), stressful (S), or non-stressful (NS) by embodiments. Any approach for classifying the level of noise into the categories may be used to classify the level of noise as VC, C, SN, N, or VN by embodiments; similarly, any approach for classifying the stress of the video signal into the categories may be used to classify the stress of the video signal as VS, S, or NS by embodiments.

The strength of the mosquito noise reduction (MNR) preprocessing filter will be automatically adapted by adaptive video preprocessor 120 when the video quality preference category of noise reduction is in either Weak, Moderate, or Strong mode. When the video quality preference category of noise reduction is set to Weak, the strength of the mosquito noise reduction (MNR) preprocessing filter is equal to Base Strength−delta, where Base Strength=the strength from Table 3 based on the classification of the noise and signal stress, and delta=MIN(2, (Base Strength+1)/2). When the video quality preference category of noise reduction is set to Moderate, the strength of the mosquito noise reduction (MNR) preprocessing filter is equal to the strength from Table 3 based on the classification of the noise and signal stress. Thus, in an embodiment, the strength of the mosquito noise reduction (MNR) preprocessing filter when noise reduction is set to Moderate is the same as when noise reduction is set to Automatic. When the video quality preference category of noise reduction is set to Strong, the strength of the mosquito noise reduction (MNR) preprocessing filter is equal to Base Strength+delta, where Base Strength=the strength from Table 6 based on the classification of the noise and signal stress, and delta=MIN(2, (Base Strength+1)/2).

In certain embodiments, the current strength of the mosquito noise reduction (MNR) preprocessing filter is filtered with its previous strength value for purposes of promoting smooth transitions when adjusting the strength of the filter. For example, the current strength the mosquito noise reduction (MNR) preprocessing filter=(strength$_{previous}$+the current strength of the mosquito noise reduction (MNR) preprocessing filter (HLPF))>>1.

Handling Extremely Noisy and Stressful Content

In an embodiment, when the source digital video signal is considered extremely noisy or extremely stressful, additional processing may be performed. Embodiments may use different criteria or methodologies for determining what constitutes an extremely noisy or extremely stressful source digital video signal.

In an embodiment, if the source digital video signal is deemed extremely stressful at the present output bit rate by adaptive video preprocessor 120, then adaptive video preprocessor 120 may increase the strength of the motion compensated temporal preprocessing filter (MCTF), the mosquito noise reduction (MNR) preprocessing filter, and the deblocking preprocessing filter and decrease the strength of the sharpening preprocessing filter. Optionally, if the source digital video signal is deemed extremely stressful at the present output bit rate by adaptive video preprocessor 120, then adaptive video preprocessor 120 may increase the strength of the horizontal low-pass preprocessing filter (HLPF) as well.

In an embodiment, if the source digital video signal is deemed extremely noisy at the present output bit rate by adaptive video preprocessor 120, then adaptive video preprocessor 120 may increase the strength of the motion compensated temporal preprocessing filter (MCTF), the mosquito noise reduction (MNR) preprocessing filter, and the deblocking preprocessing filter and decrease the strength of the sharpening preprocessing filter.

With respect to how much to adjust the strength of certain preprocessing filters, in an embodiment, if the source digital video signal is considered extremely stressful, then the following adjustments may be dynamically made by adaptive video preprocessor 120:

delta_snr=MAX(delta_snr,1)

delta_pe=MIN(−1,delta_pe)

where:
delta_snr=SNR delta to add before deriving final strength
delta_pe=Edge Enhancement delta to add before deriving final strength
The initial value for each iteration of adaptation: delta_snr=delta_pe=delta_sb=delta_cb=0. The values of delta_snr is added to the calculated base strength of preprocessing filters associated with the video quality preference category of noise reduction. The values of delta_pe is added to the calculated base strength of preprocessing filters associated with the video quality preference category of picture enhancement.

When the adaptive video preprocessor 120 is processing digital video expressed in the MPEG2 protocol, a smoother video is preferred over a sharper video. One reason for this preference is the lack of in-loop deblocking in the MPEG 2 protocol unlike in the AVC protocol. Another reason is that for standard definition video, the sharpening strength may be restricted, e.g., it may be restricted to a value of 2.

When the adaptive video preprocessor 120 is processing digital video deemed to depict a fair amount of content in motion, adaptive video preprocessor 120 may dynamically increase the strength of the motion compensated temporal preprocessing filter (MCTF), the mosquito noise reduction (MNR) preprocessing filter, and the deblocking preprocessing filter and reduce the strength of the sharpening preprocessing filter. The motion compensated temporal preprocessing filter (MCTF) is relevant for processing high motion digital video, and the mosquito noise reduction (MNR) preprocessing filter and the deblocking preprocessing filter are relevant for processing compressed high motion content. In an embodiment, the adjustments to the preprocessing filters may be calculated as follows:

speed=avg_mini_gop_speed_$x$+avg_mini_gop_speed_$y$*(if progressive,1 else 2);

If (speed>15)

delta_$snr$=MAX(1,delta_$snr$);

delta_$pe$=MIN(−1,delta_$pe$);

The values of delta_snr is added to the calculated base strength of preprocessing filters associated with the video quality preference category of noise reduction. The values of delta_pe is added to the calculated base strength of preprocessing filters associated with the video quality preference category of picture enhancement.

Qmatrix adaptation may be used by an embodiment to address noise in the source digital video signal. To further improve the video quality further and to minimize the problems of overfiltering the noise (which could lead to underflows), the strengths of preprocessing filters 122 are restricted as:

delta_$snr$=delta_$pe$=delta_$sb$=0 mctf strength=3
hlpf strength=mnr strength=deblocking strength=0
For picture with noisy segments,
If avg_MBactClass3>5000 delta_$sb$=MAX(1,delta_$sb$)

delta_$cb$=MAX(1,delta_$cb$)

If avg_MBactClass3>4000 delta_$sb$=MAX(1,delta_$sb$)

delta_$cb$=MAX(1,delta_$cb$)

delta_sb=HLPF delta to add before deriving final strength
delta_cb=Chroma Boost delta to add before deriving final strength
Init for each iteration of adaptation: delta snr=delta_pe=delta_sb=delta_cb=0;
In the above equations, the value avg_MBactClass3 represents the average macroblock activity for class 3. Embodiments may encode up to four different classes per image using different quants for perceptual quality coding.

Typically video is separated into four different classes based on the average_mb_activity of the picture. Classes could represent class 0 below 0.3*average_mb_activity, class 1 below 0.7*average_mb_activity, class 2 below 1.1*average_mb_activity, and class 3 above. Typically class 3 contains the higher activity macroblocks in a picture. The above equation is checking if there are higher activity segments or group of macroblocks, typically in class 3. The different classes are used for perceptual masking. Perceptual masking typically assigns lower qscales to lower activity classes and relatively higher value to higher classes to balance the distortion. Distortion is more visible to the human eye in low activity regions compared to high activity regions.

Stress Bias, Picture Enhancement and Source Noise Reduction Dependency

In most cases, the video quality preference categories of stress bias, noise reduction, and picture enhancement operate independently of each other. These categories are designed to address different aspects of digital video. The video quality preference category of stress bias is intended to control the stress on the encoded content through the horizontal low-pass preprocessing filter (HLPF) and encoding tools. The video quality preference category of noise reduction in intended to improve the compressibility of the digital video. The video quality preference category of picture enhancement is intended to improve the edges, contrast and colors in the digital video.

However, certain selected combinations of values for video quality preference categories may operate at cross-purposes with each other. To minimize such conflict in the values of the video quality preference categories that have been selected by a user, automatic adjustments may be made by adaptive video preprocessor 120 in some cases to the strength of certain preprocessing filters. To illustrate an example, in an embodiment, when the video quality preference category of stress bias is assigned the value of "cleaner" and the video quality preference categories of picture enhancement is set greater than "medium", then the relative strength of certain preprocessing filters associated with stress bias or picture enhancement is reduced (for example, by 1) by adaptive video preprocessor 120. As the user in this example chose a "cleaner" picture, the user has expressed a preference for video quality that is distortion free. However picture enhancement would act contrary to that goal by enhancing edges, colors and thus increasing the likelihood of introducing higher distortion. Therefore, the strength of preprocessing filters associated with picture enhancement is reduced to prevent this from happening.

As another example, in an embodiment, when the video quality preference category of stress bias is assigned the value of "Sharper Picture" and the video quality preference category of noise reduction is set greater than "Moderate", then the relative strength of certain preprocessing filters associated with noise reduction is reduced (for example, by 1) by adaptive video preprocessor 120, since preprocessing filters associated with noise reduction would work again providing a sharper picture.

Additional Adaptation Increment Strength

In certain circumstances when digital video is particularly noisy or particularly stressful, the strengths of preprocessing filters may be adjusted further. Embodiments of the invention may use a variety of different standards for determining what constitutes a particular noisy or stressful digital video.

Hardware Mechanisms

In an embodiment, one or more of user device 110, portal 120, the content management system (CMS) 130, content delivery network 140, video server 150, user data storage 155, packager 160, and DRM module 170 depicted in FIG.

Figure 7:
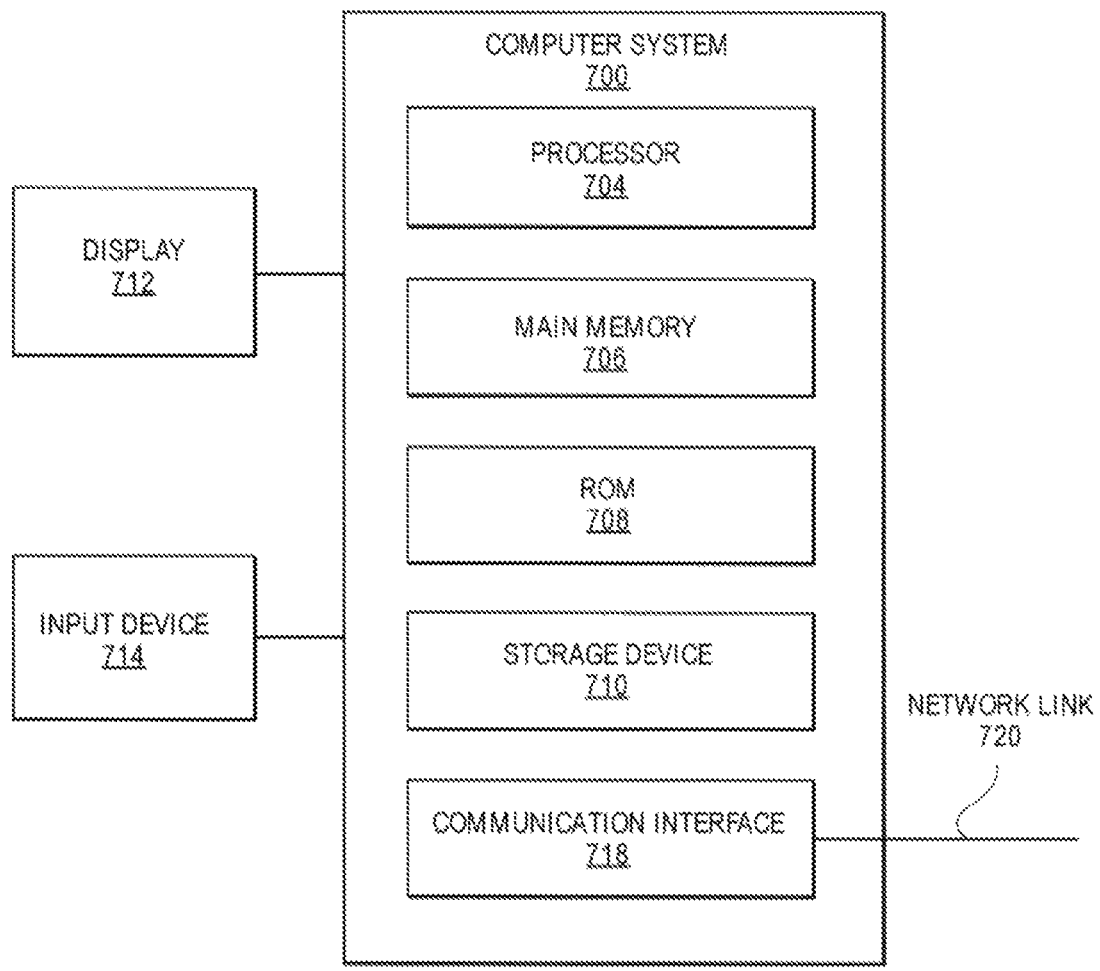
FIG. 7 is a block diagram that illustrates a computer system upon which an embodiment of the invention may be implemented.

1 may be implemented by one or more computer systems. FIG. 7 is a block diagram that illustrates a computer system 700 upon which an embodiment of the invention may be implemented. In an embodiment, computer system 700 includes processor 704, main memory 706, ROM 708, storage device 710, and communication interface 718. Computer system 700 includes at least one processor 704 for processing information. Computer system 700 also includes a main memory 706, such as a random access memory (RAM) or other dynamic storage device, for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device for storing static information and instructions for processor 704. A storage device 710, such as a magnetic disk or optical disk, is provided for storing information and instructions.

Computer system 700 may be coupled to a display 712, such as a cathode ray tube (CRT), a LCD monitor, and a television set, for displaying information to a user. An input device 714, including alphanumeric and other keys, is coupled to computer system 700 for communicating information and command selections to processor 704. Other non-limiting, illustrative examples of input device 714 include a mouse, a trackball, or cursor direction keys for communicating direction information and command selections to processor 704 and for controlling cursor movement on display 712. While only one input device 714 is depicted in FIG. 7, embodiments of the invention may include any number of input devices 714 coupled to computer system 700.

Embodiments of the invention are related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 704 for execution. For example, the instructions may initially be carried on a magnetic disk of a remote computer. The remote computer can load the instructions into its dynamic memory and send the instructions over a network link 720 to computer system 700.

Communication interface 718 provides a two-way data communication coupling to a network link 720 that is connected to a local network. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through a local network to a host computer or to data equipment operated by an Internet Service Provider (ISP).

Computer system 700 can send messages and receive data, including program code, through the network(s), network link 720 and communication interface 718. For example, a server might transmit a requested code for an application program through the Internet, a local ISP, a local network, subsequently to communication interface 718. The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium that stores one or more sequences of instructions for dynamic pre-filtering of digital video, which when executed by one or more processors, cause:
an adaptive video preprocessor determining a current video complexity of the digital video and an output bit rate; and
the adaptive video preprocessor dynamically updating a strength of one or more preprocessing filters based on (a) the current video complexity, (b) the output bit rate, and (c) a selected value of a video quality preference category, wherein the video quality preference category is assigned two or more natural language values which are each translatable into a particular strength value for at least one of the one or more preprocessing filters, wherein dynamically updating the filtering strength of the one or more preprocessing filters comprises:
upon the adaptive video preprocessor determining that a ratio of the current video complexity to the output bit rate for the digital video exceeds a threshold at the output bit rate, the adaptive video preprocessor dynamically increasing the strength of the motion compensated temporal preprocessing filter (MCTF), the mosquito noise reduction (MNR) preprocessing filter, and the deblocking preprocessing filter and decreasing the strength of the sharpening preprocessing filter.

2. The non-transitory computer-readable storage medium of claim 1, wherein execution of the one or more sequences of instructions further cause:
upon the adaptive video preprocessor determining that the digital video has a complexity-output bit rate ratio that is higher than a threshold, the adaptive video preprocessor dynamically updating the strength of one or more preprocessing filters to sharpen and enhance color of the digital video.

3. The non-transitory computer-readable storage medium of claim 1, wherein execution of the one or more sequences of instructions further cause:
upon the adaptive video preprocessor determining that the digital video has a complexity-output bit rate ratio that is lower than a threshold, the adaptive video preprocessor dynamically updating the strength of one or more preprocessing filters to preserve more color of the digital video and remove more noise and artifacts from the digital video.

4. The non-transitory computer-readable storage medium of claim 1, wherein the adaptive video preprocessor updates the strength of the one or more preprocessing filters based, at least in part, upon selected values of two or more video quality preference categories, wherein the two or more video quality preference categories each is assigned two or more natural language values which are each translatable into a particular strength value for at least one of the one or more preprocessing filters.

5. The non-transitory computer-readable storage medium of claim 1, wherein updating the filtering strength of the one or more preprocessing filters comprises:
upon the adaptive video preprocessor determining that the output bit rate is lower than a threshold, the adaptive video preprocessor increasing the filtering strength of at least one of the one or more preprocessing filters to increase the smoothing of edges of the digital video.

6. The non-transitory computer-readable storage medium of claim 1, wherein updating the filtering strength of the one or more preprocessing filters comprises:
upon the adaptive video preprocessor determining that an amount of motion depicted by the digital video exceeds a threshold, the adaptive video preprocessor increasing the filtering strength of at least one of the one or more preprocessing filters responsible for smoothing edges of the digital video.

7. The non-transitory computer-readable storage medium of claim 1, wherein updating the filtering strength of the one or more preprocessing filters comprises:
upon the adaptive video preprocessor determining that a qscale value for the digital video exceeds a threshold, the adaptive video preprocessor dynamically increasing the strength of a smoothened picture preprocessing filter to reduce the qscale value of the digital video.

8. The non-transitory computer-readable storage medium of claim 1, wherein updating the filtering strength of the one or more preprocessing filters comprises:
the adaptive video preprocessor employing a curve tracing strategy to use an algorithm to derive an updated filter strength for at least one of the one or more preprocessing filters.

9. The non-transitory computer-readable storage medium of claim 1, wherein updating the filtering strength of the one or more preprocessing filters comprises:
upon the adaptive video preprocessor determining that the stress level of the digital video exceeds a threshold at the output bit rate, the adaptive video preprocessor dynamically increasing the strength of the horizontal low-pass preprocessing filter (HLPF).

10. The non-transitory computer-readable storage medium of claim 1, wherein updating the filtering strength of the one or more preprocessing filters comprises:
upon the adaptive video preprocessor determining that a selected combination of or video quality preference category values operate at cross-purposes with each other, the adaptive video preprocessor automatically changing the filter strength of at least one of the one or more preprocessing filters from a particular default filter strength designated by a user.

11. An apparatus for dynamic pre-filtering of digital video, comprising:
one or more processors; and
one or more non-transitory computer-readable storage mediums storing one or more sequences of instructions, which when executed, cause:
an adaptive video preprocessor determining a current video complexity of the digital video and an output bit rate; and
the adaptive video preprocessor dynamically updating a strength of one or more preprocessing filters based on (a) the current video complexity, (b) the output bit rate, and (c) a selected value of a video quality preference category, wherein the video quality preference category is assigned two or more natural language values which are each translatable into a particular strength value for at least one of the one or more preprocessing filters, wherein dynamically updating the filtering strength of the one or more preprocessing filters comprises:
upon the adaptive video preprocessor determining that a ratio of the current video complexity to the output bit rate for the digital video exceeds a threshold at the output bit rate, the adaptive video preprocessor dynamically increasing the strength of the motion compensated temporal preprocessing filter (MCTF), the mosquito noise reduction (MNR) preprocessing filter, and the deblocking preprocessing filter and decreasing the strength of the sharpening preprocessing filter.

12. The apparatus of claim 11, wherein execution of the one or more sequences of instructions further cause:
upon the adaptive video preprocessor determining that the digital video has a complexity-output bit rate ratio that is higher than a threshold, the adaptive video preprocessor dynamically updating the strength of one or more preprocessing filters to sharpen and enhance color of the digital video.

13. The apparatus of claim 11, wherein execution of the one or more sequences of instructions further cause:
upon the adaptive video preprocessor determining that the digital video has a complexity-output bit rate ratio that is lower than a threshold, the adaptive video preprocessor dynamically updating the strength of one or more preprocessing filters to preserve more color of the digital video and remove more noise and artifacts from the digital video.

14. The apparatus of claim 11, wherein the adaptive video preprocessor updates the strength of the one or more preprocessing filters based, at least in part, upon selected values of two or more video quality preference categories, wherein the two or more video quality preference categories each may is assigned two or more natural language values which are each translatable into a particular strength value for at least one of the one or more preprocessing filters.

15. The apparatus of claim 11, wherein updating the filtering strength of the one or more preprocessing filters comprises:
upon the adaptive video preprocessor determining that the output bit rate is lower than a threshold, the adaptive video preprocessor increasing the filtering strength of at least one of the one or more preprocessing filters to increase the smoothing of edges of the digital video.

16. The apparatus of claim 11, wherein updating the filtering strength of the one or more preprocessing filters comprises:
upon the adaptive video preprocessor determining that an amount of motion depicted by the digital video exceeds a threshold, the adaptive video preprocessor increasing the filtering strength of at least one of the one or more preprocessing filters responsible for smoothing edges of the digital video.

17. The apparatus of claim 11, wherein updating the filtering strength of the one or more preprocessing filters comprises:
upon the adaptive video preprocessor determining that a qscale value for the digital video exceeds a threshold, the adaptive video preprocessor dynamically increasing the strength of a smoothened picture preprocessing filter to reduce the qscale value of the digital video.

18. The apparatus of claim 11, wherein updating the filtering strength of the one or more preprocessing filters comprises:
the adaptive video preprocessor employing a curve tracing strategy to use an algorithm to derive an updated filter strength for at least one of the one or more preprocessing filters.

19. The apparatus of claim 11, wherein updating the filtering strength of the one or more preprocessing filters comprises:
upon the adaptive video preprocessor determining that the stress level of the digital video exceeds a threshold at the output bit rate, the adaptive video preprocessor dynamically increasing the strength of the horizontal low-pass preprocessing filter (HLPF).

20. The apparatus of claim 11, wherein updating the filtering strength of the one or more preprocessing filters comprises:
upon the adaptive video preprocessor determining that a selected combination of or video quality preference category values operate at cross-purposes with each other, the adaptive video preprocessor automatically changing the filter strength of at least one of the one or more preprocessing filters from a particular default filter strength designated by a user.

21. A method for dynamic pre-filtering of digital video, comprising:
an adaptive video preprocessor determining a current video complexity of the digital video and an output bit rate; and
the adaptive video preprocessor dynamically updating a strength of one or more preprocessing filters based on (a) the current video complexity, (b) the output bit rate, and (c) a selected value of a video quality preference category, wherein the video quality preference category is assigned two or more natural language values which are each translatable into a particular strength value for at least one of the one or more preprocessing filters,
wherein dynamically updating the filtering strength of the one or more preprocessing filters comprises:
upon the adaptive video preprocessor determining that a ratio of the current video complexity to the output bit rate for the digital video exceeds a threshold at the output bit rate, the adaptive video preprocessor dynamically increasing the strength of the motion compensated temporal preprocessing filter (MCTF), the mosquito noise reduction (MNR) preprocessing filter, and the deblocking preprocessing filter and decreasing the strength of the sharpening preprocessing filter.

22. The method of claim 21, further comprising:
upon the adaptive video preprocessor determining that the digital video has a complexity-output bit rate ratio that is higher than a threshold, the adaptive video preprocessor dynamically updating the strength of one or more preprocessing filters to sharpen and enhance color of the digital video.

23. The method of claim 21, further comprising:
upon the adaptive video preprocessor determining that the digital video has a complexity-output bit rate ratio that is lower than a threshold, the adaptive video preprocessor dynamically updating the strength of one or more preprocessing filters to preserve more color of the digital video and remove more noise and artifacts from the digital video.

* * * * *